(12) United States Patent
Cordero et al.

(10) Patent No.: US 9,710,381 B2
(45) Date of Patent: Jul. 18, 2017

(54) METHOD AND APPARATUS FOR CACHE MEMORY DATA PROCESSING

(71) Applicant: International Business Machines Corporation, Armonk, NY (US)

(72) Inventors: Edgar R. Cordero, Round Rock, TX (US); David M. Daly, Yorktown Heights, NY (US); Robert K. Montoye, Yorktown Heights, NY (US); Saravanan Sethuraman, Bangalore (IN); Diyanesh B. Chinnakkonda Vidyapoornachary, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 14/307,648

(22) Filed: Jun. 18, 2014

(65) Prior Publication Data

US 2015/0370706 A1 Dec. 24, 2015

(51) Int. Cl.
| | |
|---|---|
| *G06F 12/08* | (2016.01) |
| *G06F 9/50* | (2006.01) |
| *G06F 12/0811* | (2016.01) |
| *G06F 13/16* | (2006.01) |
| *G06F 13/40* | (2006.01) |

(Continued)

(52) U.S. Cl.
CPC ...... *G06F 12/0811* (2013.01); *G06F 9/45558* (2013.01); *G06F 9/50* (2013.01); *G06F 12/0833* (2013.01); *G06F 13/1673* (2013.01); *G06F 13/4045* (2013.01); *G06F 3/00* (2013.01);

(Continued)

(58) Field of Classification Search
CPC ..... G06F 9/50; G06F 3/06; G06F 3/00; G06F 12/08; G06F 12/02; G06F 12/12
See application file for complete search history.

(56) References Cited

U.S. PATENT DOCUMENTS

| | | | |
|---|---|---|---|
| 5,263,161 A | 11/1993 | Barth et al. | |
| 5,784,698 A | 7/1998 | Brady et al. | |

(Continued)

FOREIGN PATENT DOCUMENTS

| | | |
|---|---|---|
| EP | 0213832 A2 | 3/1987 |
| EP | 1965304 A1 | 9/2008 |
| JP | 05-120039 | 5/1993 |

OTHER PUBLICATIONS

List of IBM Patents or Patent Applications Treated as Related, U.S. Appl. No. 14/573,970, filed Dec. 17, 2014, 2 pages.

(Continued)

*Primary Examiner* — Henry Tsai
*Assistant Examiner* — Christopher a Daley
(74) *Attorney, Agent, or Firm* — Patterson + Sheridan, LLP (57) ABSTRACT

Apparatus and methods are disclosed that enable the allocation of a cache portion of a memory buffer to be utilized by an on-cache function controller (OFC) to execute processing functions on "main line" data. A particular method may include receiving, at a memory buffer, a request from a memory controller for allocation of a cache portion of the memory buffer. The method may also include acquiring, by an on-cache function controller (OFC) of the memory buffer, the requested cache portion of the memory buffer. The method may further include executing, by the OFC, a processing function on data stored at the cache portion of the memory buffer.

10 Claims, 7 Drawing Sheets

(51) Int. Cl.
*G06F 9/455* (2006.01)
*G06F 12/0831* (2016.01)
*G06F 3/00* (2006.01)

(52) U.S. Cl.
CPC .............. *G06F 2009/45583* (2013.01); *G06F 2212/283* (2013.01); *G06F 2212/62* (2013.01)

(56) References Cited

U.S. PATENT DOCUMENTS

| | | | |
|---|---|---|---|
| 6,112,045 A | 8/2000 | Hauman | |
| 6,119,214 A | 9/2000 | Dirks | |
| 6,161,153 A * | 12/2000 | Porterfield | G06F 13/4059 710/310 |
| 6,412,045 B1 * | 6/2002 | DeKoning | G06F 12/0804 711/133 |
| 6,437,789 B1 * | 8/2002 | Tidwell | G06F 12/0848 345/531 |
| 6,542,957 B2 | 4/2003 | Miura et al. | |
| 6,985,937 B1 | 1/2006 | Keshav et al. | |
| 7,035,989 B1 | 4/2006 | Hinker et al. | |
| 7,636,819 B2 | 12/2009 | Aisup | |
| 7,934,070 B2 | 4/2011 | Brittain et al. | |
| 8,006,064 B2 | 8/2011 | Li et al. | |
| 8,074,049 B2 | 12/2011 | Gelson et al. | |
| 8,230,431 B2 | 7/2012 | Harris | |
| 8,341,269 B2 | 12/2012 | Balani et al. | |
| 8,418,185 B2 | 4/2013 | Durham et al. | |
| 8,443,161 B2 * | 5/2013 | Cho | G06F 12/0888 711/118 |
| 8,554,747 B2 | 10/2013 | Barsness et al. | |
| 8,601,221 B2 | 12/2013 | Chirca et al. | |
| 8,645,965 B2 | 2/2014 | Zimmer et al. | |
| 8,713,279 B2 | 4/2014 | Komikado et al. | |
| 9,086,957 B2 | 7/2015 | Cordero et al. | |
| 2005/0010723 A1 * | 1/2005 | Cho | G06F 12/0888 711/118 |
| 2006/0265553 A1 | 11/2006 | Arimilli et al. | |
| 2008/0072027 A1 | 3/2008 | Zimmer et al. | |
| 2008/0115137 A1 | 5/2008 | Gower et al. | |
| 2008/0271054 A1 | 10/2008 | Allison et al. | |
| 2008/0309676 A1 | 12/2008 | Nehab et al. | |
| 2009/0089788 A1 | 4/2009 | Turner | |
| 2009/0138887 A1 | 5/2009 | Uehara et al. | |
| 2009/0193232 A1 * | 7/2009 | Watanabe | G06F 12/0831 712/205 |
| 2009/0217273 A1 | 8/2009 | Mutlu et al. | |
| 2009/0217280 A1 | 8/2009 | Miller et al. | |
| 2010/0115330 A1 | 5/2010 | Khatri et al. | |
| 2010/0191918 A1 * | 7/2010 | Lee | G06F 12/0862 711/137 |
| 2010/0191929 A1 | 7/2010 | Rawson, III | |
| 2010/0299673 A1 | 11/2010 | Shultz et al. | |
| 2011/0023027 A1 | 1/2011 | Kegel et al. | |
| 2011/0055435 A1 | 3/2011 | Nito et al. | |
| 2011/0126209 A1 | 5/2011 | Housty | |
| 2011/0138091 A1 | 6/2011 | Housty | |
| 2011/0138117 A1 | 6/2011 | Nakamura et al. | |
| 2011/0173405 A1 | 7/2011 | Grabarnik et al. | |
| 2011/0238927 A1 | 9/2011 | Hatano | |
| 2012/0072915 A1 | 3/2012 | Jones et al. | |
| 2012/0102183 A1 | 4/2012 | Murakami et al. | |
| 2012/0117347 A1 | 5/2012 | Fienblit et al. | |
| 2012/0124415 A1 | 5/2012 | Borkenhagen et al. | |
| 2012/0151152 A1 * | 6/2012 | Minami | G06F 12/0831 711/146 |
| 2012/0215959 A1 | 8/2012 | Kwon et al. | |
| 2012/0311300 A1 | 12/2012 | Sundrani et al. | |
| 2013/0031312 A1 * | 1/2013 | Jones | G06F 12/0862 711/137 |
| 2013/0111308 A1 | 5/2013 | Sauber et al. | |
| 2013/0132683 A1 | 5/2013 | Ajanovic et al. | |
| 2013/0138891 A1 | 5/2013 | Chockler et al. | |
| 2013/0198448 A1 | 8/2013 | Ish et al. | |
| 2013/0219328 A1 | 8/2013 | Rosen et al. | |
| 2013/0290641 A1 * | 10/2013 | Corrie | G06F 12/0875 711/133 |
| 2013/0305007 A1 | 11/2013 | Kawano et al. | |
| 2013/0346668 A1 | 12/2013 | Floman et al. | |
| 2014/0040576 A1 * | 2/2014 | Cordero | G06F 11/2221 711/162 |
| 2014/0181576 A1 | 6/2014 | Chahal et al. | |
| 2015/0113226 A1 * | 4/2015 | Accapadi | G06F 12/0891 711/136 |
| 2015/0370711 A1 * | 12/2015 | Cordero | G06F 12/0811 711/122 |

OTHER PUBLICATIONS

U.S. Appl. No. 14/573,970, "Method and Apparatus for Cache Memory Data Processing," Dec. 17, 2014, 30 pages.
Herrero et al., Elastic Cooperative Caching: An Autonomous Dynamically Adaptive Memory Hierachy for Chip Multiprocessors; Proceedings of the 37th Annual International Symposium on Computer Architecture, pp. 419-428, (Jun. 2010).
IBM; "Memory Controller Managed Backing of Superpages"; http://www.ip.com/pubview/IPCOM00003395AD; Jan. 6, 2005.
Christopher, KW.—et al.; "Profiling Technique for Memory References within Individual Pages on Paging Based Virtual Memory Systems"; http://www.ip.com/pubview/IPCOM000109356—Aug. 1, 1992.
Anonymous; "Method for Hardware Accelerated Real-Time Virtual Memory Management with Page Fault Prediction"; http://www.ip.com/pubview/IPCOM000074641D; Feb. 23, 2005.
U.S. Appl. No. 13/948,290 entitled: Requesting Memory Spaces and Resources Using a Memory Controller, Jul. 23, 2013.
U.S. Appl. No. 13/565,503; Non-Final Office Action dated May 9, 2014; 9 pages.
List of IBM Patents or Applications Treated as Related.
U.S. Appl. No. 14/307,648, filed Jun. 18, 2014.
U.S. Appl. No. 14/573,970, filed Dec. 17, 2014.
U.S. Appl. No. 13/948,290, filed Jul. 23, 2013.
U.S. Appl. No. 14/832,473, filed Aug. 21, 2015.

* cited by examiner

METHOD AND APPARATUS FOR CACHE MEMORY DATA PROCESSING

FIELD OF THE DISCLOSURE

The present disclosure generally relates to cache memory data processing.

BACKGROUND

A computer system may have a variety of hardware devices (e.g., a central processing unit (CPU)) that request and share resources (e.g., memory) of the system. Accessing these resources may have associated latencies that can affect, for example processing performance of a CPU. Access latency for a CPU may involve the time interval between when a CPU initiates a request for data retrieved from or data storage to a main memory and when delivery or storage of the data occurs. The delays resulting from access latency may hamper the ability of a CPU to manage the processing workload of the CPU and may impact the performance of the CPU. Attempts to improve processing performance of a CPU by addressing access latency between device and resource may involve reducing the physical distance between main memory and the CPU, or increasing transfer speeds (e.g., bus speed) between devices and resources, or by utilizing "in memory" databases to store all data at main memory (instead of on-disk).

However, addressing latency alone to improve processing performance may have limitations as next generation computer systems demand more sophisticated functions and features to accommodate increasing data processing workloads. The increased demand drives the adoption of newer technologies but also the continued improvement of available techniques at the sub-system level.

SUMMARY

Conventional computer memory arrangements utilize cache memory to source data to a CPU in order to reduce latency to a CPU (e.g., "core"). Cache memory "close" to the core further reduces latency to the core. These types of memory arrangements may provide performance improvements to a computer system. Typically, computer cache memory is organized into several hierarchies to improve overall performance needs of the system. Cache memory at each level of hierarchy will have a degree of latency for a read access by the core. Generally, the core looks for data at the first level of hierarchy (L1) of a cache memory. If the data is not present at L1, the core searches for the data at the second level of hierarchy (L2) of the cache memory, and so on until the data is found. This formal engagement of the cache memory may restrict usage of the cache memory in order to reduce read latency to and from the core. As a result of this formal engagement, the traditional use of cache memory in a system is to act as a data storage area that provides minimal access latency to the core. However, utilizing cache memory in a non-traditional manner may enable newer capabilities and functions that can further enhance system performance. For example, by transforming a portion of cache memory into an area for data operations and storage may relieve a system processor from computationally intensive tasks and enable the processor to perform other tasks while the processor waits for processing results from a transformed cache area. The transformation of cache memory provides an "elastic" quality to the cache memory enabling the cache memory to be used as an area for both data storage and for data processing. Leveraging a cache memory area in the transformative manner may expand the role of cache memory to perform a variety of potential new functions that can improve data processing performance as well as system performance overall.

Methods and apparatuses are disclosed that enable the allocation of a cache portion of a memory buffer to be utilized by an on-cache function controller (OFC) to execute processing functions on "main line" data (e.g., data retrieved from or to be stored to "main memory"). A memory controller may process a request for the cache portion and grant control of the cache portion to the OFC to use in executing data processing functions. For example, a processor core may relieve processing burden by requesting an off-processor cache (e.g., level four (L4) cache) to perform certain data processing functions. An OFC of the L4 cache may use the L4 cache (of a portion thereof) to execute the data processing functions.

According to a first technique, also called "local elasticity," a request for a cache portion of a single memory buffer is received by a memory controller. The memory controller receiving the request may select a memory buffer to use for the request and grant control of the cache portion of the memory buffer to an OFC of the memory buffer. The OFC may use the cache portion of the memory buffer to execute one or more data processing functions on "main line" data in accordance with the request. Upon completion of the data processing function(s) by the OFC, a request to release of the cache portion of the memory buffer is received by the memory controller. The memory controller processes the request and the OFC relinquishes control of the cache portion of the memory buffer.

According to a second technique, also called "global elasticity," a request for a cache portion belonging to more than one memory buffer is received by a memory controller. The memory controller receiving the request may select the memory buffers to use for the request and grant control of the cache memory of each of the memory buffers to be used to a particular OFC of one of the memory buffers. The OFC having control of the cache portions of the memory buffer it is associated with and one or more other memory buffers may act as a "primary" OFC. The primary OFC may utilize the cache portions of the memory buffers that are controlled by the primary OFC and may utilize other OFCs of the other memory buffers as "secondary" OFCs in order to execute one or more data processing functions on "main line" data in accordance with the request. Upon the completion of the data processing function(s), a request to release of the cache portions of the memory buffers is received by the memory controller. The memory controller processes the request and the primary OFC relinquishes control of the cache portions of the one or more other memory buffers.

In a particular embodiment, a method includes receiving, at a memory buffer, a request from a memory controller for acquisition of a portion of the memory buffer. The method also includes acquiring, by an on-cache function controller (OFC) of the memory buffer, the requested portion of the memory buffer. The method also includes executing, by the OFC, a processing function on data stored in the portion of the memory buffer.

In another particular embodiment, an apparatus includes a memory buffer. The apparatus also includes a processor configured to execute a computer program configured to request a portion of the memory buffer. The apparatus further includes a memory controller configured to receive the request for the portion of the memory buffer, and to send an acquisition request to the memory buffer. The memory buffer further includes an on-cache function controller (OFC) configured to acquire the portion of the memory buffer in response to the acquisition request from the memory controller, and to execute a processing function on data stored in the portion of the memory buffer.

In another particular embodiment, an apparatus includes a memory buffer. The memory buffer includes an on-cache function controller (OFC) configured to acquire a portion of the memory buffer and to execute a processing function on data stored in the portion of the memory buffer.

One particular advantage provided by at least one of the disclosed embodiments is improved data processing performance. For example, when a processor is overburdened with processing functions, techniques described herein may enable the off-loading of processing functions to an OFC of a memory buffer and improve data processing performance of the computing system. Another particular advantage provided by at least one of the disclosed embodiments is improved data security. For example, the encryption of data may require additional processing and available memory beyond the general capacity of a system. Techniques described herein may enable an OFC of a memory buffer to address the additional processing and memory requirements demanded by the encryption and security of data while avoiding a processor performance penalty.

Other aspects, advantages, and features of the present disclosure will become apparent after a review of the entire application, including the following sections: Brief Descriptions of the Drawings, Detailed Description, and the Claims.

DETAILED DESCRIPTION

Figure 1:
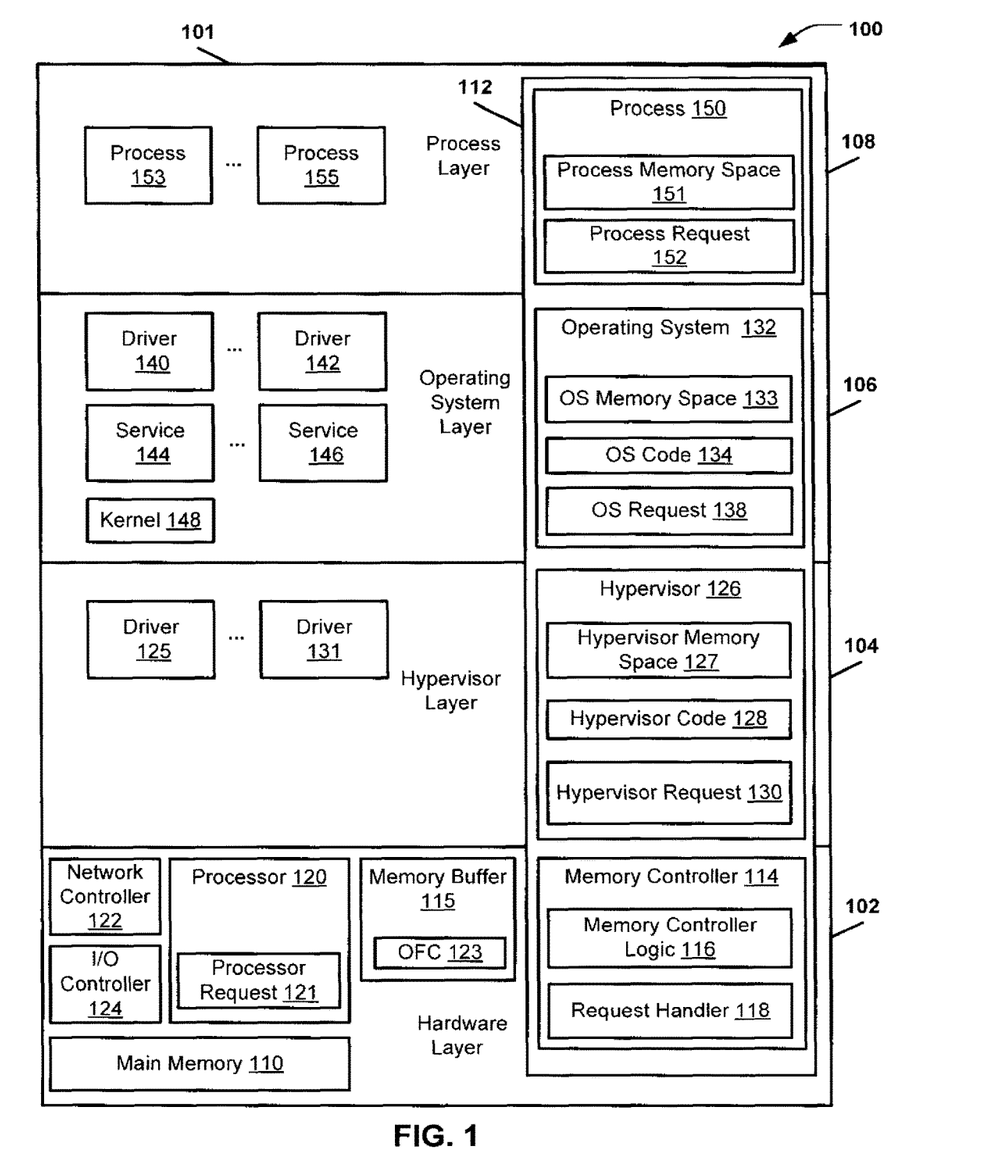
FIG. 1 is a block diagram of an apparatus configured to process a request for a cache portion of a memory buffer.

Referring to FIG. 1, an overview of a first embodiment of an apparatus 100 configured to process a request for a cache portion of a memory buffer 115 (e.g., a request that is communicated after an initialization period) is shown. The apparatus 100, in specific embodiments, may include a computer, a computer system, a computing system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 101 may be a multi-user computer, such as a computer available from International Business Machines Corporation (IBM®) (a registered trademark of International Business Machines (IBM) Corp., Armonk, N.Y., United States).

The computer 101 may include a hardware layer 102, a hypervisor layer 104 above the hardware layer 102, an operating system layer 106 above the hypervisor layer 104, and a user process layer or simply process layer 108 above the operating system layer 106. Elements such as those illustrated in area 112 from the layers 102, 104, 106, 108 may be utilized to generate and send a request for a cache portion of a memory buffer 115 to a memory controller 114, as well as initialize and perform operations on a memory 110 as instructed (e.g., by the hypervisor layer 104, the operating system layer 106, and/or the process layer 108). The request for the cache portion of a memory buffer 115 may come from the layers 102, 104, 106, and/or 108 in the form of a processor request 121, a hypervisor request 130, an OS request 138, or a process request 152. Each form of request may be processed by a request handler 118 of the memory controller 114

Figure 2:
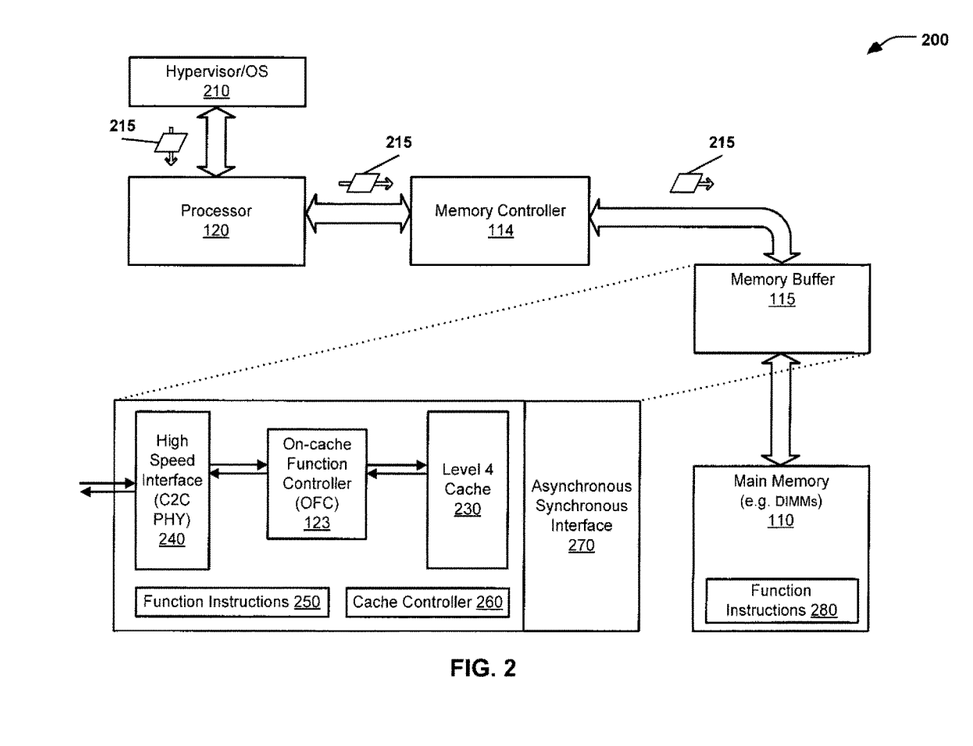
FIG. 2 is a block diagram of the software and hardware components of an apparatus configured to process a request for a cache portion of a memory buffer.

Of note, although FIG. 1 and FIG. 2 include a hypervisor (e.g., hypervisor 126 or 210, respectively) that may send a request for a cache portion of a memory buffer 115, a hypervisor is not required in some embodiments. For example, in a particular embodiment, the apparatus 100 of FIG. 1 may not include the hypervisor layer 104 or items thereof, and instead, an operating system 132 of the operating system layer 106 may be the computer program that generates and sends the request for the cache portion of the memory buffer 115. Moreover, in some embodiments, the computer program may not be a hypervisor or an operating system. For example, a particular embodiment of the apparatus 100 may include a computer program that the memory controller 114 may communicate with to receive the request for the cache portion of a memory buffer.

Returning to the computer 101, the hardware layer 102 may include the main memory 110 and the memory controller 114 including associated memory controller logic 116 (e.g., hardware logic) and the request handler 118. The memory 110 may be the main storage for computer 101, and may include random access memory (RAM), a dynamic random access memory (DRAM), a static random access memory (SRAM), magnetic random access memory (MRAM), a dual in-line memory module (DIMM), a flash memory, a hard disk drive, and/or another digital storage medium. The main memory 110 may be one or more DIMMs, DRAMs, etc. The main memory 110 may be accessed directly (not shown) by the memory controller 114, may be accessed by the memory controller 114 via the memory buffer 115, or both.

The memory controller logic 116 may be configured to cause the memory controller 114 to service cache requests from the layers 102, 104, 106, 108 via the request handler 118. The memory controller logic 116 may also be configured to cause the memory controller 114 to communicate with the memory buffer 115 and with an on-cache function controller (OFC) 123 of the memory buffer 115 to identify an available cache portion of the memory buffer 115. The memory controller logic 116 may further be configured to initialize the memory 110 and perform operations on the memory 110 as instructed (e.g., by the hypervisor layer 104, the operating system layer 106, and/or the process layer 108).

The hardware layer 102 of the computer 101 may also include at least one physical processor 120, as well as at least one bus (not shown). For example, the bus may be a power bus. The processor 120 may be multithreaded and/or may have multiple cores. The hardware layer 102 may also include a network controller 122 and an input/output (I/O) controller 124. The network controller 122 may provide access to at least one network. The I/O controller 124 may provide access to at least one I/O device. Indeed, the computer 101 may be coupled to a number of external input/output (I/O) devices via the bus and a plurality of interface devices that are not shown, for example, a workstation controller and/or a storage controller that respectively provide external access to one or more workstations and/or one or more storage devices such as a direct access storage device (DASD). The bus may also be coupled to a user input (not shown) operable by a user of the computer 101 to enter data (e.g., the user input sources may include a mouse, a keyboard, etc.) and a display (not shown) operable to display data from the computer 101 (e.g., the display may be a CRT monitor, an LCD display panel, etc.). The computer 101 may also be configured as a member of a distributed computing environment and communicate with other members of that distributed computing environment through a network.

The hypervisor layer 104 may include the hypervisor 126, a hypervisor memory space 127 (e.g., corresponding to an allocation of the physical memory 110 that the hypervisor 126 controls), hypervisor code 128 (e.g., to represent the program code of the hypervisor 126), and the hypervisor request 130. In particular, the hypervisor 126 may utilize the hypervisor request 130 to generate and send a request for a portion of the memory buffer 115 to the memory controller 114 via the request handler 118. The hypervisor 126 may communicate with various devices by executing device drivers, such as drivers 125, 131.

The operating system (OS) layer 106 may include the OS 132, OS memory space 133 corresponding to an allocation of memory space (e.g., from the hypervisor 126), OS code 134 (e.g., program code of the OS 132), and an OS request 138. For example, the OS 132 may utilize the OS request 138 to generate and send a request for a portion of the memory buffer 115 to the memory controller 114 via the request handler 118. The operating system layer 106 may be associated with various items, for example, drivers 140, 142, services (e.g., a service 144 for networking and a service 146 for disk swap control), and a kernel 148.

The process layer 108 may include a process 150, a process memory space 151 corresponding to an allocation of memory space (e.g., from the operating system layer 106), the process request 152, and other processes, such as processes 153, 155. The process 150 may utilize the process request 152 to generate and send a request for a portion of the memory buffer 115 to the memory controller 114 via the request handler 118. Of note, the terminology "process" is utilized herein for simplicity, but the process 150 may be an application or other entity.

By providing a memory buffer 115 that includes an on-cache function controller (OFC) 123 to execute processing functions on data stored at the memory buffer 115, the apparatus 100 may enable the off-loading of processing functions to the OFC 123 of the memory buffer and improve data processing performance of the computing system, as further described herein.

Referring to FIG. 2, additional detail of software and hardware components consistent with the apparatus 100 of FIG. 1 is shown and generally designated 200. The physical processor 120 may be in communication with a hypervisor/OS 210. For example, the hypervisor/OS 210 may correspond to the hypervisor 126 and the OS 132 of FIG. 1. The processor 120, having a central processing unit (CPU) (e.g., "core"), may be coupled to the memory controller 114 that is further coupled to the memory buffer 115 that includes the on-cache function controller (OFC) 123. The memory buffer 115 may be further coupled to the main memory 110.

In a particular embodiment, the apparatus 200 includes more than one processor 120 coupled to the memory controller 114. Each processor 120 may include a single core or may be configured to have multiple cores. The processor 120 may be associated with one or more cache memories (e.g., L1, L2, etc.) in close proximity (e.g., on processor die) to the processor 120. The processor 120 may generate a request 215 that includes a request for a cache portion of the memory buffer 115. In a particular embodiment, the request 215 corresponds to the processor request 121 of FIG. 1.

The memory controller 114 may include the request handler 118 of FIG. 1. The memory controller 114 may also include the memory controller logic 116 of FIG. 1 (e.g., hardware logic) to cause the memory controller 114 to initialize the memory 110 during the initialization period. Moreover, the memory controller 114 may utilize the memory controller logic 116 of FIG. 1 to control and manage data flow in and out of main memory 110. The memory controller 114 may be configured to receive the request 215. The request 215 may include a request for a cache portion of the memory buffer 115 (e.g., allocation of a cache). Alternatively, the request 215 may be a request to release the cache portion of the memory buffer 115 (e.g., deallocation of the cache). The memory controller 114 may process the received request 215 utilizing the request handler 118 of FIG. 1. Alternatively, the memory controller 114 may use the memory controller logic 116 of FIG. 1 to process the request 215. In a particular embodiment, the memory controller 114 may monitor for references made to memory locations and may store the monitoring results as trace data to the cache portion of the memory buffer 115.

The memory buffer 115 may include a high speed interface 240 that enables high speed communications and data transfer between the memory buffer 115 and coupled devices. Examples of the high speed interface 240 may include, but are not limited to, communicating with a coupled physical layer (PHY) or chip to chip (C2C) communication. The memory buffer 115 may include an asynchronous-synchronous interface 270 that enables the memory buffer 115 to operate asynchronously relative to the processor 120 and synchronously relative to the main memory 110.

The memory buffer 115 may include a portion of cache memory designated as level four (L4) cache memory 230. The memory buffer 115 may also include a cache controller 260 coupled to the L4 cache memory 230 that controls use of the L4 cache memory 230. The memory buffer 115 may include the on-cache function controller (OFC) 123 that couples the high speed interface 240 to the L4 cache memory 230. The OFC 123 may interact with the L4 cache memory 230 in response to instructions from the memory controller 114 in accordance with the request 215. The memory buffer 115 may also include function instructions 250 that may be accessed and used by the OFC 123 in accordance with the request 215. The memory buffer 115 may be implemented as part of a separate die not part of the processor die.

The L4 cache memory 230 (e.g., L4 cache) may be in the form RAM, DRAM, MRAM, flash memory, and/or another digital storage medium. In a particular embodiment, the L4 cache memory 230 may be in the form of SRAM. The L4 cache memory 230 may be used for data storage under the control of the cache controller 260. In a particular embodiment, the L4 cache memory 230 may be used by the OFC 123 as an area where processing functions may be executed and where the data resulting from the executed processing functions may be stored. In a particular embodiment, the L4 cache memory 230 may be used to store memory reference trace data collected by the memory controller 114 during monitoring for memory location references. The memory reference trace data stored at the L4 cache memory 230 may be used for code analysis and or debugging. In another particular embodiment, the L4 cache memory 230 may be used to store an indirection table associated with a compression or decompression function executed by the OFC 123.

The OFC 123 may be configured to receive the request 215 from the memory controller 114. The request 215 may include an allocation/deallocation request for a portion of the memory buffer 115. In response to an allocation request from the memory controller 114, the OFC 123 may secure control of the L4 cache memory 230 (or a portion thereof) and may store data to the L4 cache memory 230 in accordance with the request 215. In a particular embodiment, referred to as "local elasticity," the OFC 123 may secure control of the L4 cache memory 230 of the memory buffer the OFC 123 is associated with (e.g., the L4 cache memory 230 of memory buffer 115). Furthermore, the OFC 123 may execute processing functions on the stored data at the L4 cache memory 230 and may store the data resulting from the executed processing functions at the L4 cache memory 230. In response to a deallocation request included in the request 215 from the memory controller 114, the OFC 123 may release control of the L4 cache memory 230 portion of the memory buffer 115.

The data processing functions executed by the OFC 123 may include, but are not limited to, sorting, matrix computation, encryption, decryption, compression, decompression, error correction code (ECC) encoding, ECC decoding, scratch pad operations, diagnostics pattern generation, diagnostics pattern testing, tracing, mirroring, public or private memory buffer security key storage, data back-up, and other processing functions that may be executed by a processor (e.g., the processor 120). The instructions to execute the processing functions may be available to the OFC 123 in the form of firmware embedded at the OFC 123 or may be accessed by the OFC 123 from the function instructions 250 stored at the memory buffer 115 or from function instructions 280 stored at the main memory 110.

During operation, the processor 120 may generate and send the request 215 to the memory controller 114. The request 215 may include a request for a cache portion of the memory buffer 115 (e.g., allocation of a cache). In some embodiments, the request 215 may be generated from the hypervisor/OS 210 and sent to the memory controller 114 via the processor 120. Alternatively, the request 215 may be generated by the process 150 of FIG. 1. The request 215 may also include processing information, such as target data identifiers, location addresses of the target data, processing function(s) to be executed on the target data, and other data information for processing target data. The request 215 may indicate whether the cache portion of the memory buffer is to be allocated temporarily or whether the cache portion of the memory buffer is to be allocated permanently.

The memory controller 114 may be configured to receive and process the request 215 via the process handler 118 of FIG. 1. In a particular embodiment, the receiving and processing of request 215 may be accomplished by the memory controller logic 116 of FIG. 1. The memory controller 114 may select a particular memory buffer that is to receive the request 215. In another particular embodiment, the selection may be based on the proximity of a memory buffer to a target data location at main memory 110. In other embodiments, the selection may be based on a memory buffer proximity to a processor 120 or may be based upon a random selection.

The memory controller 114 may send the processed request 215 to the particular memory buffer 115. The sent request 215 may include instructions from the memory controller 114 granting control of the L4 cache memory 230 (or a portion thereof) to the OFC 123. The instructions may include one or more commands to the OFC 123 to execute one or more processing functions.

Based upon the request 215 and any other included instructions, the OFC 123 may negotiate control of the L4 cache memory 230 away from the cache controller 260. Negotiation of control away from the cache controller 260 may be handled by the OFC 123 itself, or may be arbitrated utilizing the memory controller 114. Upon gaining control, the OFC 123 may use the L4 cache memory 230 for storage and processing operations. Based upon the request 215, the OFC 123 may store target data identified by the request 215 to the L4 cache memory 230 and prepare processing functions to be executed on the target data. In a particular embodiment, the target data to be stored may be main-line data coming from the memory controller 114 or from the processer 120 via the memory controller 114. For example, the target data may be "new" data (e.g., data not already stored at main memory 110) originating from the processor 120 or from the hypervisor/OS 210. In another particular embodiment, the target data to be stored by the OFC 123 is target data retrieved from main memory 110 by the OFC 123.

In accordance with the request 215, the OFC 123 may execute processing functions on the target data stored at the L4 cache memory 230, such as processing functions accessible to the OFC 123 in the form of firmware embedded at the OFC 123, from function instructions 250 stored at the memory buffer 115, or from function instructions 280 stored at the main memory 110. The execution of one or more process functions may occur sequentially, concurrently or in portions by the OFC 123. Data processing functions executed by the OFC 123 may include, but are not limited to, sorting, matrix computation, encryption, decryption, compression, decompression, error correction code (ECC) encoding, ECC decoding, scratch pad operations, diagnostics pattern generation, diagnostics pattern testing, tracing, mirroring, public or private memory buffer security key storage, data back-up, and other processing functions that may be executed by a processor (e.g., the processor 120). In addition to executing processing functions, the OFC 123 may perform other general operations. These operations may include, but are not limited to, read and/or write operations to the memory buffer 115 or to the main memory 110. The results of the processing functions may be stored to the L4 cache memory 230 temporarily or permanently. Based on the request 215, the OFC 123 may send the processing results upstream to the processor 120 via the memory controller 114, store the processing results downstream to the main memory 110, or both.

Upon completion of processing functions on the target data by the OFC 123 and the storage of the results at the L4 cache memory 230, the processor 120 may generate and send another request 215 to the memory controller 114, including a request to release the previously allocated L4 cache memory 230. In a particular embodiment, the processor may generate the request 215 for cache release based on the processor 120 receiving the processing results from the OFC 123 via the memory controller 114. In another particular embodiment, the request 215 for cache release is generated based on the processor 120 receiving an indication from the OFC 123 via the memory controller 114 that the processing results have been stored to main memory 110 or stored to the memory buffer 115. In other embodiments, the request to deallocate the cache portion of the memory buffer 115 may be generated by the hypervisor/OS 210 and sent to the memory controller 114 via the processor 120.

The memory controller 114 may be configured to receive and process the request 215 to release the L4 cache memory 230. In a particular embodiment, the receiving and processing of request 215 to release the L4 cache memory 230 may be accomplished by the memory controller logic 116 of FIG. 1. The memory controller 114 may send the processed request 215 to the OFC 123. The sent request 215 may include instructions from the memory controller 114 to the OFC 123 to release control of the L4 cache memory 230 back to the cache controller 260. Based upon the request 215 for cache release and any other included instructions, the OFC 123 may negotiate release of the L4 cache memory 230 back to the cache controller 260. Negotiating control back to the cache controller 260 may be handled by the OFC 123 itself, or may be arbitrated utilizing the memory controller 114.

By providing a memory buffer 115 having an on-cache function controller (OFC) 123 that can execute processing functions on data stored at a cache portion 230 of the memory buffer 115, the apparatus 200 may relieve the processing burden of a system processor, such as the processor 120. Furthermore, interleaving OFC 123 access to main memory 110 with the "main line" traffic to main memory 110 may improve memory bandwidth usage and further improve data processing performance.

Figure 3:
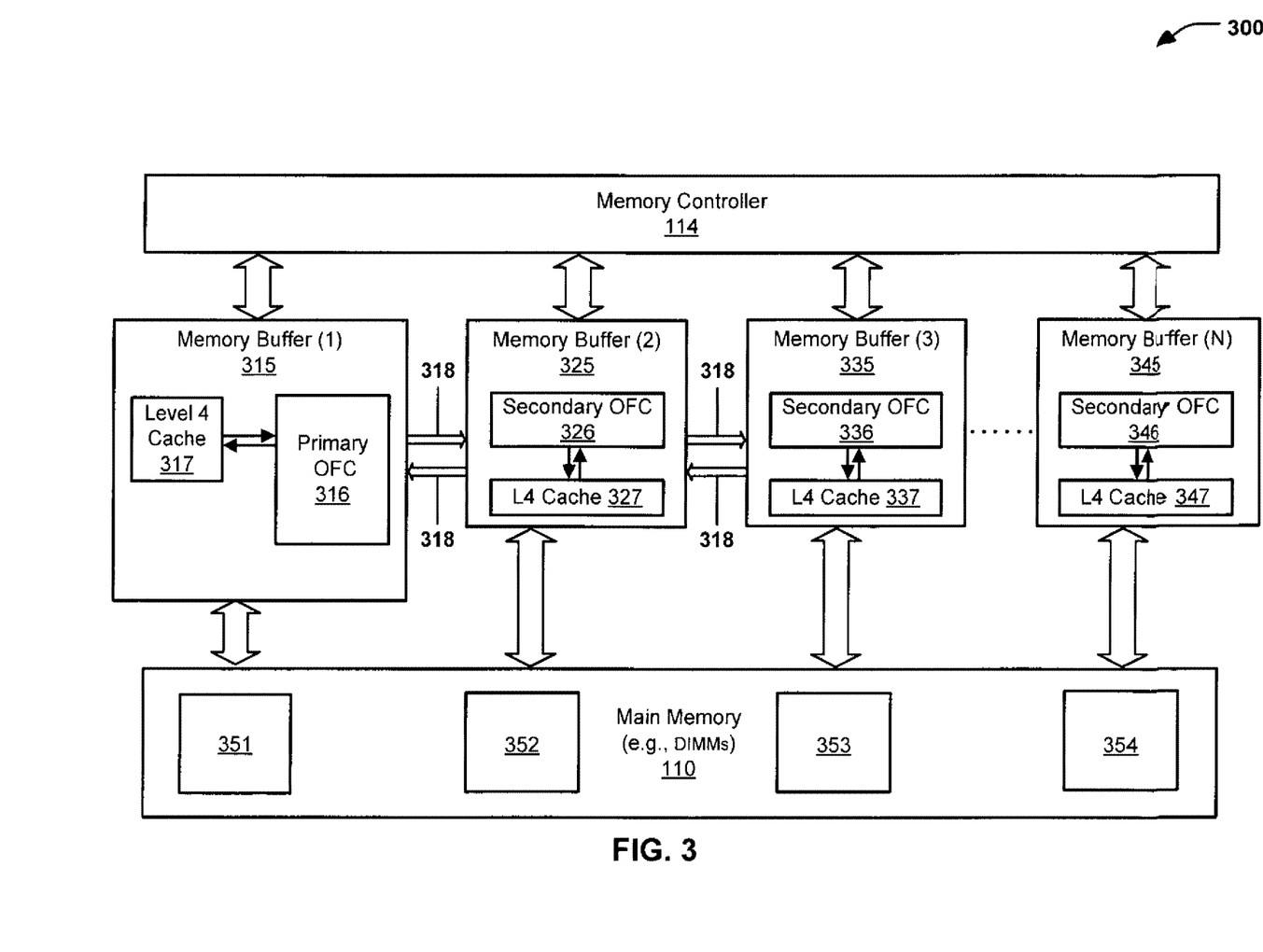
FIG. 3 is a block diagram of the hardware components configured to process a request for cache portions of one or more memory buffers.

Whereas FIG. 2 illustrates a "local elasticity" configuration involving a single OFC, FIG. 3 illustrates a "global elasticity" configuration of the apparatus. Referring to FIG. 3, additional detail of software and hardware components consistent with the apparatus 100 of FIG. 1 is shown and generally designated 300. In the embodiment of FIG. 3, the memory controller 114 is coupled to a plurality of memory buffers 315, 325, 335, 345. For example, each of the memory buffers 315, 325, 335, 345 may correspond to the memory buffer 115 of FIGS. 1 and 2. The plurality of memory buffers (315, 325, 335, 345) are coupled to the main memory 110. The plurality of memory buffers (315, 325, 335, 345) are further coupled to each other via buffer to buffer bridge channels 318.

Although not shown, the memory controller 114 may be coupled to one or more processors (e.g., the processor 120) and may receive the request 215 from the processor 120. The main memory 110 of apparatus 300 may include sectors (e.g., sectors 351-354) of memory at different locations of the main memory 110. The L4 caches 317, 327, 337, 347 of apparatus 300 may be of similar form as those described for the L4 cache memory 230 of apparatus 200 (e.g., in the form of SRAM, RAM, DRAM, MRAM, flash memory, and/or another digital storage medium). In a particular embodiment, the memory controller 114 may selectively communicate with a particular memory buffer (e.g., a first memory buffer 315) and send a request 215 to the particular memory buffer. In other embodiments, the memory controller 114 may communicate concurrently with multiple memory buffers and send requests to the multiple memory buffers.

The plurality of memory buffers may include any number of memory buffers beginning with the first memory buffer 315 thru an Nth memory buffer 345, where N is an integer greater than or equal to 1. Each memory buffer of the plurality of memory buffers (315, 325, 335, 345) may include an OFC, an L4 cache, a high speed interface, an asynchronous-synchronous interface, function instructions, and a cache controller, as described with reference to the memory buffer 115 of FIGS. 1-2. Communications and data transfer may occur between the each of the memory buffers via the buffer to buffer bridge channels 318. The bridge channels 318 may be a high speed bus enabling access of each memory buffer to another.

During operation, the processor 120 (not shown) may generate and send the request 215 (not shown) to the memory controller 114. The request 215 may include a request for cache portions of the one or more memory buffers (315, 325, 335, 345). The request 215 may be generated from a hypervisor/OS 210 or from a process 150, and sent to the memory controller 114 via the processor 120. The request 215 may also include processing information, such as target data identifiers, location addresses of the target data, processing function(s) to be executed on the target data, and other data information for processing target data. The request 215 may indicate whether the cache portions of the one or more memory buffers (315, 325, 335, 345) are to be allocated temporarily or permanently.

The memory controller 114 may receive and process the request 215. As shown in FIG. 3, the main memory 110 can have multiple sectors (351-354) corresponding to different chips, banks, segments, arrays, etc. Different sectors may be tied (e.g., coupled) to different memory buffers (315, 325, 335, 345). For example, the sector 351 may be tied to the memory buffer 315, the sector 352 may be tied to the memory buffer 325, the sector 353 may be tied to the memory buffer 335, and the sector 354 may be tied to the memory buffer 345. In a "global elasticity" scheme, the request 215 may request allocation of cache portions of multiple memory buffers. In such a scenario, the memory controller 114 may select a particular memory buffer from among the plurality of memory buffers (315, 325, 335, 345) that is to receive the request 215 and operate as a "primary" memory buffer. For example, the memory controller 114 may select the first memory buffer 315 to receive the request 215. In a particular embodiment, the selection may be based on the proximity of the first memory buffer 315 to a target data location at main memory 110. In other embodiments, the selection may be based on a proximity of the first memory buffer 315 to the processor 120 or may be based upon a random selection The memory controller 114 may send the processed request 215 to the selected "primary" memory buffer (e.g., the first memory buffer 315). The sent request 215 may include instructions from the memory controller 114 granting control of one or more L4 cache portions (317, 327, 337, 347) of the one or more memory buffers (315, 325, 335, 345) to the "primary" OFC 316. The instructions may include one or more commands to the primary OFC 316 to execute one or more processing functions. The instructions may also include, but are not limited to, target data identifiers, location addresses of the target data, processing functions to be executed on the target data, and other data information for processing target data.

Based upon the request 215 and any other included instructions, the primary OFC 316 may negotiate control of the L4 cache portion of the memory buffer the primary OFC is associated with (e.g., L4 cache 317 of memory buffer 315) and negotiate control of the one or more other L4 caches (327, 337, 347) away from the associated cache controllers (not shown) of the one or more other memory buffers (325, 335, 345). Based upon the request 215 and any other included instructions, the primary OFC 316 may store target data identified by the request 215 to the L4 caches (317, 327, 337, 347) the OFC 316 has control of on an as-needed basis and prepare processing functions to be executed on the target data.

In a particular embodiment, the target data to be stored at the one or more L4 caches by a primary OFC 316 may be main-line data coming from the memory controller 114 or from the processer 120 via the memory controller 114. In another particular embodiment, the target data to be stored by the primary OFC 316 is data stored at main memory 110 and the target data is retrieved from main memory 110 by a primary OFC 316.

The primary OFC 316 may also negotiate control of the one or more other OFCs (326, 336, 346) of the one or more other memory buffers (325, 335, 345) based upon the request 215 and any other included instructions. Negotiating control may be handled by the primary OFC 316 by itself, or may be arbitrated utilizing the memory controller 114. Under the control of the primary OFC 316, the one or more other OFCs (326, 336, 346) may act as "secondary" OFCs and operate in accordance with the commands from the primary OFC 316. Primary OFC commands may include, but are not limited to, executing processing functions, as well as any operations an OFC can perform autonomously (e.g., read/write operations to a memory buffer or main memory).

In accordance with the request 215, the primary OFC 316 may execute one or more data processing functions on the target data stored at the L4 caches (317, 327, 337, 347) the primary OFC 316 has control of. In a particular embodiment, the primary OFC 316 may coordinate the execution of one or more data processing functions by the one or more "secondary" OFCs (326, 336, 346). For example, primary OFC 316 may execute one or more data processing functions and may command the secondary OFCs (326, 336, 346) to execute other data processing functions. In another particular embodiment, the primary OFC 316 may further coordinate the storage and transfer of the data processing results of the secondary OFCs (326, 336, 346) that may be executing data processing functions. For example, the primary OFC 316 may instruct a secondary OFC (e.g., secondary OFC 326) to store data processing results downstream to main memory 110, may instruct a different secondary OFC (e.g., secondary OFC 336) to transfer data processing results upstream to a processor 120 via memory controller 114, or both. Additionally, the data processing results of a secondary OFC may be stored or transferred to the memory controller 114 or to the main memory 110 via the primary OFC 316.

Data processing functions executed by the OFCs (316, 326, 336, 346) may include, but are not limited to, sorting, matrix computation, encryption, decryption, compression, decompression, error correction code (ECC) encoding, ECC decoding, scratch pad operations, diagnostics pattern generation, diagnostics pattern testing, tracing, mirroring, public or private memory buffer security key storage, data back-up, and other processing functions that may be executed by a processor (e.g., the processor 120). The execution of one or more data processing functions by the primary OFC 316, and the secondary OFCs 326 and 336 to 346 may occur sequentially, concurrently or in portions. In addition to executing data processing functions, the primary OFC 316 may perform other general operations including, but not limited to, read and/or write operations to one or more of the plurality of memory buffers (315, 325, 335, 345) or to main memory 110. The data processing results of the primary OFC 316 and the one or more other OFCs (326, 336, 346) may be stored to the corresponding L4 caches (317, 327, 337, 347) temporarily or permanently.

Upon completion of data processing functions executed by a primary OFC 316 and/or other secondary OFCs (326, 336, 346) on target data and the storage of data processing results at one or more L4 caches (317, 327, 337, 347), the processor 120 may generate and send another request 215 to the memory controller 114, including a request to release the previously allocated one or more L4 cache portions (317, 327, 337, 347) of the one or more memory buffers (315, 325, 335, 345). In a particular embodiment, the processor may generate the request 215 for L4 cache release based on the processor 120 receiving processing results or an indication from the primary OFC 316 or from the secondary OFCs (326, 336, 346) via the memory controller 114. In other embodiments, the request to deallocate the cache portions may be generated by the hypervisor/OS 210 and sent to the memory controller 114 via the processor 120.

The request 215 to release the one or more L4 cache portions (317, 327, 337, 347) of the one or more memory buffers (315, 325, 335, 345) may be received and processed by the memory controller 114. The memory controller 114 may send the processed request 215 to the primary OFC 316 of the selected memory buffer 315. The sent request 215 may include instructions from the memory controller 114 instructing the primary OFC 316 to release control of the L4 caches (317, 327, 337, 347) back to the respective associated cache controllers (not shown). Based upon the request 215 and any other included instructions, the primary OFC 316 may be configured to negotiate release of the L4 caches (317, 327, 337, 347) and transfer control back to the respective cache controllers. Transfer of control may be handled by the primary OFC 316 itself, or may be coordinated with the memory controller 114.

The "global elasticity" configuration of the apparatus 300 provides a plurality of memory buffers each having an OFC that can execute data processing functions on data stored at allocated L4 cache portions of the plurality of memory buffers. Such a configuration may increase the data processing ability of a computing system and may substantially relieve the processing burden of the computing systems one or more processors (e.g. the processor 120) to further improve data processing performance and system efficiency.

Figure 4:
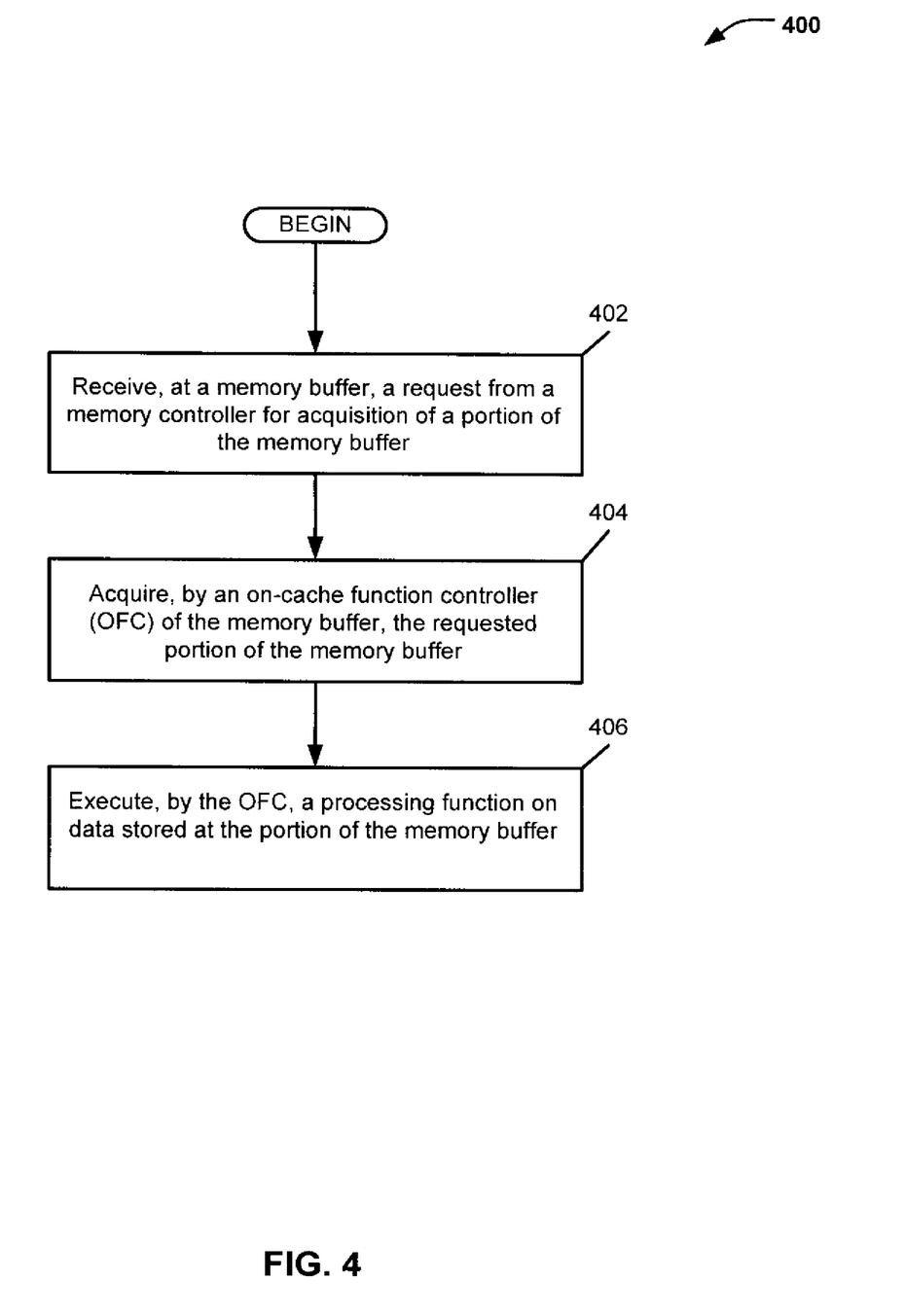
FIG. 4 is a flowchart to illustrate a first embodiment of a method of operation at a memory buffer that includes an on-cache function controller (OFC)

Referring to FIG. 4, a first embodiment of a method 400 of operation at a memory buffer that includes an on-cache function controller (OFC) is shown. The method 400 may be executed by the apparatus 100 of FIG. 1 and/or the apparatus 200 of FIG. 2. The method 400 may be illustrated with reference to FIGS. 1-2.

The method 400 may include receiving, at a memory buffer, a request from a memory controller for acquisition of a portion of the memory buffer, at 402. For example, the memory buffer 115 may receive from the memory controller 114 a request (e.g., the request 215 of FIG. 2) for the acquisition of a portion of the memory buffer 115. The request may be sent from the hypervisor 126 via the hypervisor request 130, from the OS 132 via the OS request 138, from the processor 120 via the processor request 121, or from the process 150 via the process request 152. The memory controller 114 may process the request 215 via the request handler 118, via the memory control logic 116, or both.

The method 400 may further include acquiring, by an on-cache function controller (OFC) of the memory buffer, the requested portion of the memory buffer, at 404. For example, the OFC 123 may acquire a portion of the memory buffer 115. The portion of the memory buffer 115 acquired by the OFC 123 may be all or a portion of the L4 cache memory 230. The OFC 123 may acquire the cache portion from the cache controller 260 by itself or may coordinate with the memory controller 114 to arbitrate the acquisition of L4 cache memory 230 from the cache controller 260.

The method 400 may further include executing, by the OFC, a processing function on data stored at the portion of the memory buffer, at 406. For example, having acquired control of L4 cache memory 230, the OFC 123 may execute a processing function on data stored at the L4 cache memory 230 portion of the memory buffer 115. The processing function may be identified by the request 215 received from the memory controller 114. The accumulation and cache storage of data resulting from the executed processing function may be controlled by the OFC 123. For example, the OFC 123 may control the storage of data resulting from the executed processing functions to the main memory 110. The OFC 123 may also control the transfer of the data resulting from the executed processing functions to the memory controller 114 as part of a transfer to other entities in accordance with the request received by the memory controller 114.

Figure 5:
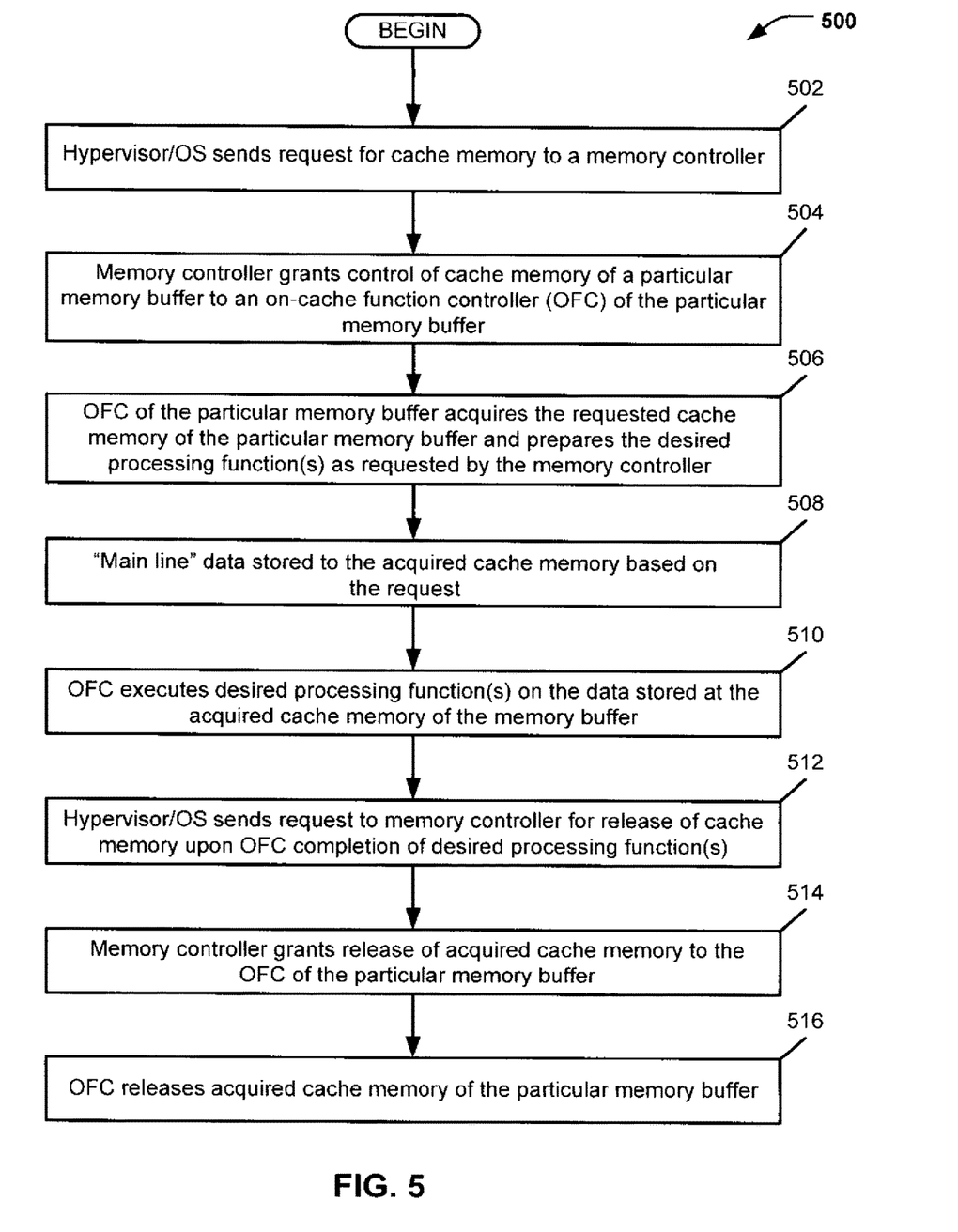
FIG. 5 is a flowchart to illustrate a first embodiment of a method of operation of a memory system that includes an on-cache function controller (OFC)

Referring to FIG. 5, a first embodiment of a method 500 of operation of a memory system that includes an on-cache function controller (OFC) is shown. The method 500 may be executed by the apparatus 100 of FIG. 1 and/or the apparatus 200 of FIG. 2. The method 500 may be illustrated with reference to FIGS. 1-2

The method 500 may include a hypervisor and/or an OS sending a request for cache memory to a memory controller, at 502. For example, the request for cache memory (e.g., the request 215 of FIG. 2) may be sent from the hypervisor/OS 210 of FIG. 2 to the memory controller 114. In other embodiments, the request 215 for cache memory may be sent from the hypervisor 126 via the hypervisor request 130 of FIG. 1, from the OS 132 via the OS request 138 of FIG. 1, from the processor 120 via the processor request 121 of FIG. 1, or from the process 150.

The method 500 may further include a memory controller granting control of cache memory of a particular memory buffer to an on-cache function controller (OFC) of the particular memory buffer, at 504. For example, having received the request 215 for cache memory (e.g., the request from the hypervisor/OS 210 of FIG. 2), the memory controller 114 may process the request. The memory controller 114 may grant control of the cache memory of a particular memory buffer 115, to the OFC 123 of the particular memory buffer 115. Allocation of cache memory to the OFC 123 from the cache controller 260 of FIG. 2 of the corresponding memory buffer 115 may be coordinated between the OFC 123 and the memory controller 114 or may be handled by the OFC 123 by itself.

The method 500 may further include the OFC of the particular memory buffer acquiring the requested cache memory of the particular memory buffer and preparing the desired processing function(s) as requested by the memory controller, at 506. For example, the OFC 123 of memory buffer 115, having been granted control of the L4 cache memory 230 of FIG. 2, may acquire L4 cache memory 230 from the cache controller 260 by itself or may utilize the memory controller 114 to arbitrate the acquisition of L4 cache memory 230 from the cache controller 260. The OFC 123 may set up and prepare the execution of desired processing functions based upon the request (e.g., the request 215 of FIG. 2) received by the memory controller 114.

The method 500 may further include the storing "main line" data to the acquired cache memory based on the request, at 508. For example, based on the request received by the memory controller 114, "main line" data may be retrieved by the OFC 123 from the main memory 110 or may be received from the hypervisor/OS 210 via a processor 120 via the memory controller 114 and the OFC 123 may store the "main line" data to the acquired L4 cache memory 230 of the memory buffer 115. The "main line" data may be "new" data received from the processor 120 via the memory controller 114 or may be existing data stored at main memory 110.

The method 500 may further include the OFC executing desired processing function(s) on the data stored at the acquired cache memory of the memory buffer, at 510. For example, the desired processing function(s) to be performed on the data stored at the acquired cache memory may be executed by the OFC 123. The accumulation and cache storage of data resulting from the executed processing functions may be controlled by the OFC 123. For example, the OFC 123 may control the storage of data resulting from the executed processing functions to the main memory 110. Furthermore, the OFC 123 may also control the transfer of resulting data to the memory controller 114 as part of a transfer to other entities in accordance with the request (e.g., the request 215 of FIG. 2) received by the memory controller 114.

The method 500 may further include the hypervisor/OS sending a request to memory controller for release of cache memory upon OFC completion of desired processing function(s), at 512. For example, upon completion of the desired processing functions by the OFC 123, the hypervisor/OS 210 of FIG. 2 may send the request (e.g., the request 215 of FIG. 2) to the memory controller 114 to release the acquired L4 cache memory 230.

The method 500 may further include the memory controller granting release of acquired cache memory to the OFC of the particular memory buffer, at 514. For example, having received the request (e.g., the request 215 of FIG. 2) for release of the acquired cache memory from the hypervisor/OS 210 of FIG. 2, the memory controller 114 may grant release of the L4 cache memory 230 of FIG. 2 to the OFC 123 of the particular memory buffer 115. Deallocation of the L4 cache memory 230 of FIG. 2 from the OFC 123 back to the cache controller 260 of the corresponding memory buffer 115 may be coordinated between the OFC 123 and the memory controller 114 or may be handled by the OFC 123 by itself.

The method 500 may further include the OFC releasing acquired cache memory of the particular memory buffer, at 516. For example, in response to the request for release of cache memory received by the memory controller 114, the OFC 123 may release control of the L4 cache memory 230 of the memory buffer 115. The OFC 123 may release the cache portion to the cache controller 260 by itself or may coordinate with the memory controller 114 to arbitrate the release of the acquired L4 cache memory 230 back to the cache controller 260.

Figure 6:
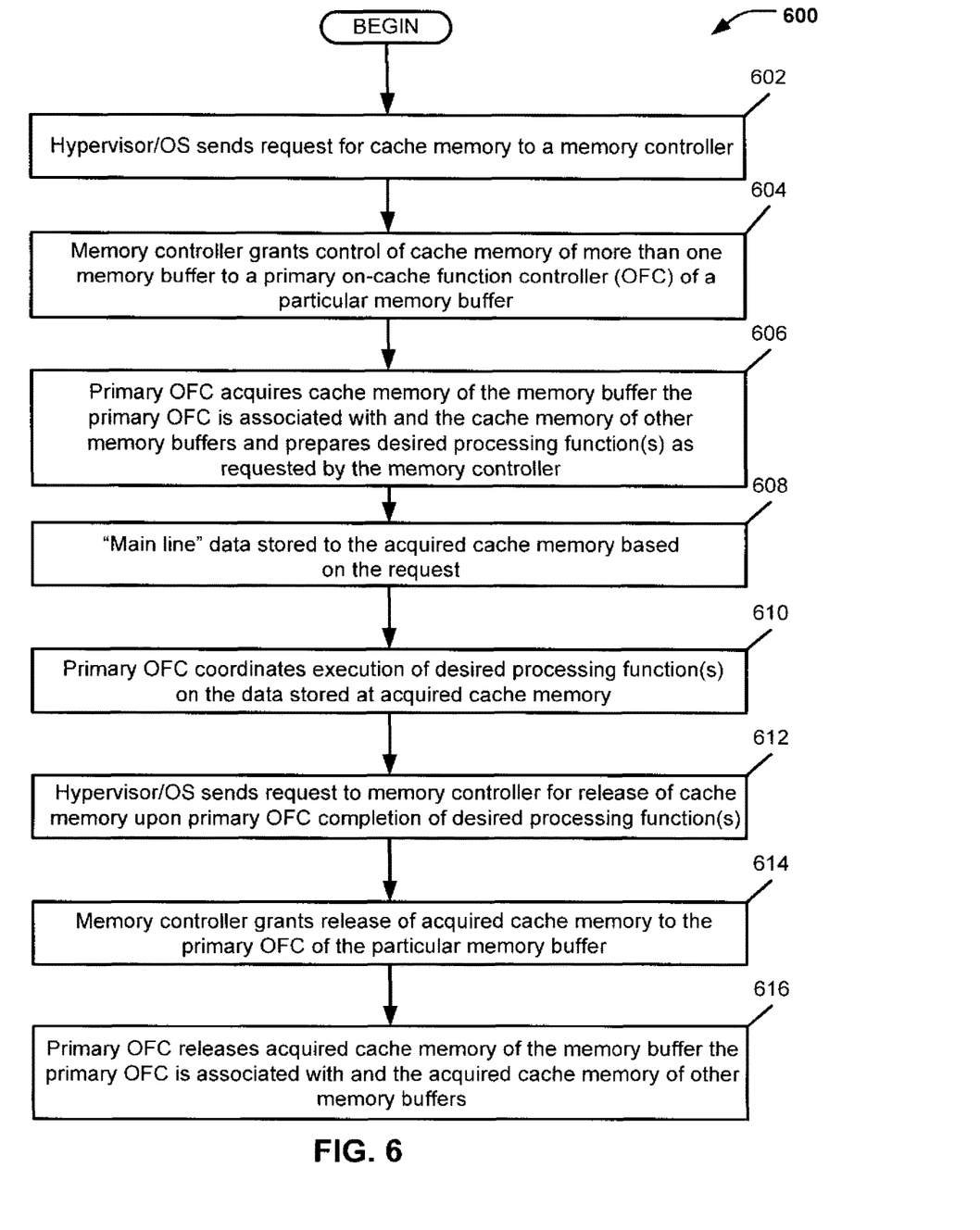
FIG. 6 is a flowchart to illustrate a second embodiment of a method of operation of a memory system that includes an on-cache function controller (OFC)

Referring to FIG. 6, a second embodiment of a method 600 of operation of a memory system that includes an on-cache function controller (OFC) is shown. The method 600 may be executed by the apparatus 100 of FIG. 1 and/or the apparatus 200 of FIG. 2. The method 600 may be illustrated with reference to FIGS. 1-3

The method 600 may include a hypervisor and/or an OS sending a request for cache memory to a memory controller, at 602. For example, the request for cache memory (e.g., the request 215 of FIG. 2) may be sent from the hypervisor/OS 210 of FIG. 2 to the memory controller 114. In other embodiments, the request 215 may be sent from the hypervisor 126 via the hypervisor request 130 of FIG. 1, from the OS 132 via the OS request 138 of FIG. 1, from the processor 120 via the processor request 121 of FIG. 1, or from the process 150.

The method 600 may further include a memory controller granting control of the cache memory of more than one memory buffer to a primary on-cache function controller (OFC) of a particular memory buffer, at 604. For example, having received the request for cache memory (e.g., the request 215 of FIG. 2) from the hypervisor/OS 210 of FIG. 2, the memory controller 114 may grant control of the cache memory of one or more memory buffers (e.g., the memory buffers 315, 325, 335, 345 of FIG. 3) to a primary OFC (e.g., the primary OFC 316 of FIG. 3) of the particular memory buffer 315. Allocation and control of cache memory to the primary OFC 316 from cache controllers of the corresponding memory buffers (315, 325, 335, 345) may be coordinated between the primary OFC 316 and the memory controller 114 or may be handled by the primary OFC 316 by itself. Additionally, the cache memory to be controlled by the primary OFC may be based on the request received by the memory controller 114. Furthermore, the choice of the particular memory buffer 315 by the memory controller 114 may be based on proximity of the particular memory buffer 315 to particular data of the main memory 110 in accordance with the request received by the memory controller 114.

The method 600 may further include the primary OFC acquiring the cache memory of the memory buffer the primary OFC is associated with and the cache memory of other memory buffers and prepares desired processing function(s) as requested by the memory controller, at 606. For example, the primary OFC 316 of memory buffer 315 may acquire cache memory 317 of the memory buffer 315 the OFC 316 is associated with and may also acquire the cache memory (e.g., cache memory 327, 337, 347) of other memory buffers (325, 335, 345) based on the request received by the memory controller 114. The primary OFC 316 may negotiate acquisition of the cache memory from corresponding cache controllers by itself or may coordinate with the memory controller 114 to arbitrate the acquisition of cache memory. The primary OFC 316 may also acquire control over one or more other OFCs resulting in "secondary" OFCs (e.g., OFCs 326, 336, 346) under the control of the primary OFC 316. The primary OFC 316 may set up and prepare the execution of desired processing functions based upon the request (e.g., the request 215 of FIG. 2) received by the memory controller 114. Acquisition and control, by the primary OFC 316, of one or more other cache portions (327, 337, 347) of the one or more other memory buffers (325, 335, 345) and the control of the corresponding one or more other OFCs (326, 336, 346) may occur via bridge channels 318 between the memory buffers (315, 325, 335, 345).

The method 600 may further include the storing of "main line" data to the acquired cache memory based on the request, at 608. For example, the primary OFC 316 may store "main line" data to the acquired cache memory 317 of memory buffer 315 and to other acquired cache memory (e.g., cache memory 327, 337, and 347) under the primary OFC 316 control. Based on the request received be the memory controller 114, "main line" data may be retrieved by the primary OFC 316 from the main memory 110 or may be received from the hypervisor/OS via the processor 120 via the memory controller 114. The "main line" data may be "new" data received by the memory controller 114 or may be existing data stored at main memory 110.

The method 600 may further include the primary OFC coordinating execution of desired processing function(s) on the data stored at acquired cache memory, at 610. For example, desired processing function(s) to be executed on data stored at acquired cache memory may be executed by the primary OFC 316, may be executed by secondary OFCs (e.g., OFCs 326, 336, 346) designated by the primary OFC 316 or may be executed by both the primary and secondary OFCs. The primary OFC 316 may coordinate the execution of the desired processing functions, and the accumulation and cache storage of data resulting from the executed processing functions. For example, primary OFC 316 may coordinate the storage of processing results to the main memory 110 or the transfer of processing results to the memory controller 114 as part of a transfer to other entities in accordance with the request received by the memory controller 114.

The method 600 may further include the hypervisor/OS sending a request to the memory controller for release of cache memory upon primary OFC completion of desired processing function(s), at 612. For example, upon completion of the desired processing functions by the primary OFC 316, by secondary OFCs (326, 336, 346) designated by the primary OFC 316 or by both primary and secondary OFCs, the hypervisor/OS 210 of FIG. 2 may send another request (e.g., the request 215 of FIG. 2) to the memory controller 114 to release the previously acquired cache memory (e.g., cache memory 317, 327, 337, 347).

The method 600 may further include the memory controller granting release of acquired cache memory to the primary OFC of the particular memory buffer, at 614. For example, the memory controller 114 may grant release of the cache memory under the control of the primary OFC 316 of the particular memory buffer 315 (e.g., cache memory 317, 327, 337, 347) of memory buffers (315, 325, 335, 345). Deallocation of cache memory from the primary OFC 316 back to cache controllers (e.g., cache controllers similar to cache controller 260 of FIG. 2) of the corresponding memory buffers (315, 325, 335, 345) may be coordinated between the primary OFC 316 and the memory controller 114 or may be handled by the primary OFC 316 by itself.

The method 600 may further include the primary OFC releasing acquired cache memory of the memory buffer the primary OFC is associated with and the acquired cache memory of other memory buffers, at 616. For example, in response to the request for release of cache memory received by the memory controller 114, the primary OFC 316 may release control of the cache memory 317 of the memory buffer 315 the primary OFC 316 is associated with and release any other previously acquired cache memory from the other memory buffers (e.g., cache memory 327, 337, 347 of memory buffers 325, 335, 345). The primary OFC 316 may negotiate release of acquired cache memories back to corresponding cache controllers by itself or the memory controller 114 may arbitrate the release of previously acquired cache memory back to corresponding cache controllers.

Figure 7:
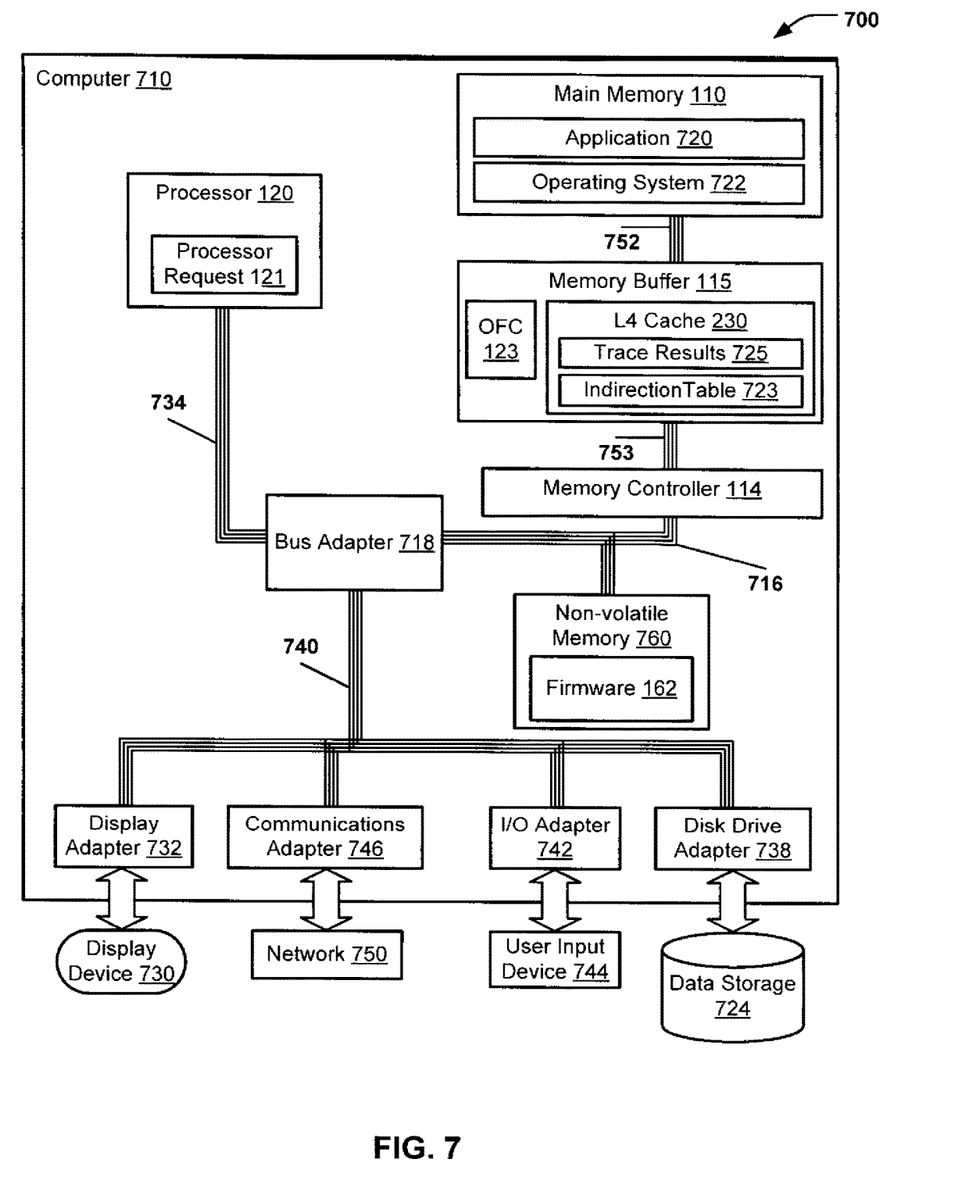
FIG. 7 is a block diagram of an exemplary computer system operable to support embodiments of computer-implemented methods, computer program products, and system components as illustrated in FIGS. 1-6.

Referring to FIG. 7, an exemplary automated computing machinery including a computer 710 is shown. The computer 710 is an exemplary implementation of the computer 101 of FIG. 1. The computer 710 includes at least one computer processor (CPU) 120 as well as the main memory (e.g., DIMMs) 110, the memory buffer 115, the memory controller 114, and a non-volatile memory 760. The memory 110 is connected through a high speed memory bus 752 to the memory buffer 115. The memory buffer 115 is connected through the high speed memory bus 753 to the memory controller 114. The memory controller 114 and the non-volatile memory 760 are connected through a high speed memory bus 716 and a bus adapter 718 to the processor 120 through a processor bus 734.

The memory buffer 115 includes the on-cache function controller (OFC) 123 and a level four (L4) cache memory 230. In a particular embodiment, the OFC 123 has control of the L4 cache memory 230 and executes processing functions on data stored at the L4 cache memory 230. The L4 cache memory 230 may store trace results 725 associated with the monitoring by the memory controller 114 for references to memory locations. The L4 cache memory 230 may also store an indirection table 723 associated with data compression and decompression functions executed by the processor 120 or the OFC 123.

The memory controller 114 may allocate the L4 cache memory 230 of the memory buffer 115 to the OFC 123 for execution of processing functions on stored data at the L4 cache memory 230. For example, the memory controller 114 may receive a request 215 (not shown) from the processor 120 via the processor bus, bus adapter 718, and the high speed memory bus 716. The memory controller 114 may process the request and grant control of the L4 cache memory 230 to the OFC 123 via the high speed memory bus 753.

The non-volatile memory 760 includes firmware 162. In a particular embodiment, the firmware 162 may direct the memory controller 114 to perform runtime memory testing at a memory location of a DRAM stack of the memory 110. For example, the firmware 162 may place the chip mark associated with the memory location and direct the memory controller 114 to initiate memory testing at the memory location.

Stored at the memory 110 is an application 720 that may be a module of user-level computer program instructions for carrying out particular tasks (e.g., word processing, spreadsheets, database operations, video gaming, stock market simulations, graphics simulations, atomic quantum process simulations, or other user-level applications). Also stored at the memory 110 is an operating system 722. Operating systems useful in connection with disclosed embodiments include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 722 and the application 720 in the example of FIG. 7 are shown in memory 110, but components of the aforementioned software may also, or in addition, be stored at non-volatile memory (e.g., on data storage, such as illustrative data storage 724 and/or the non-volatile memory 760).

The computer 710 includes a disk drive adapter 738 coupled through an expansion bus 740 and the bus adapter 718 to the processor 120 and other components of the computer 710. The disk drive adapter 738 connects non-volatile data storage to the computer 710 in the form of the data storage 724 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art.

The computer 710 also includes one or more input/output ("I/O") adapters 742 that implement user-oriented input/output through, for example, software drivers and computer hardware for controlling input and output to and from user input devices 744, such as keyboards and mice. In addition, the computer 710 includes a communications adapter 746 for data communications with a data communications network 750. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 746 implements the hardware level of data communications through which one computer sends data communications to another computer, directly or through a data communications network. Examples of the communications adapter 746 suitable to use in the computer 710 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 710 also includes a display adapter 732 that facilitates data communication between the bus adapter 718 and a display device 730, enabling the application 720 to visually present output on the display device 730.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor that includes but is not limited to firmware, resident software, microcode, etc.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. a memory buffer comprising an on-cache function controller (OFC) and a cache controller;
   a processor configured to request a cache portion of the memory buffer; and
   a memory controller configured to:
      receive the request for the cache portion of the memory buffer; and
      send an allocation request to the memory buffer, wherein the OFC is configured to:
         acquire the cache portion of the memory buffer in response to the allocation request from the memory controller; and
         execute an arithmetic data processing function using a processor on data at the cache portion of the memory buffer, wherein the memory buffer is controlled by the OFC in accordance with a memory request.

2. The apparatus of claim 1, wherein the request originates from a hypervisor, an operating system (OS), or a combination thereof.

3. The apparatus of claim 1, wherein the cache portion of the memory buffer is a level four (L4) cache.

4. The apparatus of claim 1, wherein the request indicates one or more commands to execute the processing function.

5. The apparatus of claim 4, wherein the processing function includes at least one of sorting, matrix computation, encryption, decryption, compression, decompression, error correction code (ECC) encoding, ECC decoding, scratch pad operations, diagnostics pattern generation, diagnostics pattern testing, tracing, mirroring, public or private memory buffer security key storage, data back-up, or any combination thereof.

6. The apparatus of claim 1, wherein the OFC has control over one or more other cache portions of one or more other memory buffers via bridge channels between the memory buffer and the one or more other memory buffers.

7. The apparatus of claim 6, wherein the OFC has control of one or more other OFCs of the one or more other memory buffers via bridge channels between the memory buffer and the one or more other memory buffers.

8. An apparatus, comprising; a memory buffer a memory buffer comprising an on-cache function controller (OFC) and a cache controller implemented in hardware, wherein the OFC is configured to: acquire a cache portion of the memory buffer; and execute an arithmetic data processing function using a processor on data at the cache portion of the memory buffer, wherein the memory buffer is controlled by the OFC in accordance with a memory request.

9. The apparatus of claim 8, wherein the processing function includes at least one of sorting, matrix computation, encryption, decryption, compression, decompression, error correction code (ECC) encoding, ECC decoding, scratch pad operations, diagnostics pattern generation, diagnostics pattern testing, tracing, mirroring, public or private memory buffer security key storage, data back-up, or any combination thereof.

10. The apparatus of claim 8, wherein the OFC has control over one or more other cache portions and one or more other OFCs of one or more other memory buffers via bridge channels between the memory buffer and the one or more other memory buffers.

* * * * *